United States Patent Office 2,993,777
Patented July 25, 1961

---

2,993,777
HERBICIDAL COMPOSITIONS AND METHOD
Karl-Heinz Mittelberger, Erich Hambsch, and Heribert Hahne, all of Gersthofen, near Augsburg, Germany, assignors to Farbwerke Hoechst Aktiengesellschaft vormals Meister Lucius & Brüning, Frankfurt am Main, Germany, a corporation of Germany
No Drawing. Filed June 2, 1959, Ser. No. 817,452
Claims priority, application Germany Feb. 23, 1957
3 Claims. (Cl. 71—2.7)

This invention relates to herbicidal compositions and more particularly to herbicidal compositions containing salts of pentachlorobutadienoic acid and monochloracetic acid. This application is a continuation-in-part of our co-pending application Serial No. 716,281, filed February 20, 1958, now abandoned.

It is the object of the present invention to provide an effective means for the selective combatting of dicotyledonous weeds. It is a further object of the present invention to provide a better development of useful gramineae by destroying dicotyledonous weeds. It is a further object of the present invention to apply said herbicidal compositions by spraying and dusting.

A further object of the present invention is the synergistic effect exerted by the combination of salts of pentachlorobutadienoic acid with monochloracetic acid.

The herbicidal action of the salts of pentachlorobutadienoic acid (Steinmetz, U.S. Patent 2,789,044) and of the monochloracetic acid (Swezey, U.S. Patent 2,649,363) is known. In practice, however, both types of compounds failed to attain importance. Although they were repeatedly applied experimentally for combatting dicotyledonous weeds in agricultural and horticultural plantations, they produced only uncertain effects and caused damage to the plants because of their insufficient selectivity.

Both types of compounds also proved unsuitable for the combatting of weeds in corn fields, because they damaged the cereals even when they were applied at such small rates which were not sufficient for killing the weeds.

Now, we have found that the alkali metal and alkaline-earth-metal salts of pentachlorobutadienoic acid, 1,2,3,4,4-pentachlorobutadien-(1,3)-oic-(1) acid;

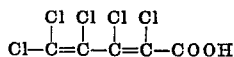

combined with the corresponding salts of monochloracetic acid display a synergistic effect. We have further found that the selectivity against dicotyledonous plants is increased by such combination whereby the successful combatting of weeds in agricultural and horticultural plantations, particularly in cereal plants is now possible. Instead of the alkali or alkaline-earth-metal salts of said acids, there may also be used the ammonium or substituted ammonium salts.

In carrying out the invention, said salts may be dissolved in water as a carrier to produce a product adapted for spraying which product contains 1 to 5% of a salt of monochloracetic acid and 0.1 to 0.5% of a salt of pentachlorobutadienoic acid along with a metal of the group consisting of alkali and alkaline-earth metals. The quantity of the spray product being applied amounts to 100 cc. per square meter or about 1000 liter per hectare (2.471 acres). The herbicidal compositions may also be incorporated with other carriers such as wetting agents or they may be mixed with inert material to form dusts.

The following examples which are by way of illustration and not of limitation clearly demonstrate the synergistic effect and the high degree of selectivity. The plants used for the tests were, among others, beans (*Vicia faba*), since beans are generally recognized test plants for the groups of dicotyledones as they record any action of herbicides, even that of very small amounts, by producing marked symptoms.

Example 1

In a greenhouse beans (*Vicia faba*) were treated 21 days after sowing with aqueous solutions of calcium monochloracetate and the calcium salt of pentachlorobutadienoic acid, and, for comparison, with a solution of the mixture of these two active substances. All the spray liquors were applied at a rate of 100 cc. per square meter.

The degrees of damage to the plants are expressed by the following numbers:

No influence _____ 0
A trace of damage _____ 1
Slight damage _____ 2
Damage insufficient to kill the plant, but growth markedly checked _____ 3
Considerable injury which will probably kill the plant _ 4
Total destruction, the plant was killed _____ 5

The results given in the following table show that the synergistic action of the mixture killed the beans.

| Active substance | Calcium monochloracetate | | | Calcium salt of pentachlorobutadienoic acid | | | Calcium monochloracetate + calcium salt of pentachlorobutadienoic acid | |
|---|---|---|---|---|---|---|---|---|
| Percent | 2.0 | 3.0 | 4.0 | 0.2 | 0.5 | 1.0 | 2.0+0.1 | 3.0+0.1 |
| After days | 9 | 9 | 9 | 9 | 9 | 9 | 9 | 7 |
| Degree of damage to beans | 1 | 2 | 2 | 1 | 2 | 4 | 5 | 5 |

Example 2

A mixture of seeds of oats (*Avena sativa*), wheat (*Triticum sativum*), barley (*Hordeum sativum*), a mixture of grasses that thrive in the shade, and cleavers (*Galium aparine*) was sown in beds 1 square meter in area in a vegetation hall, and 6 weeks later the beds were sprayed with aqueous solutions of calcium monochloracetate and of the calcium salt of pentachlorobutadienoic acid, and, for comparison, with a solution of the mixture of these two substances; the solutions were applied at the rate of 100 cc. per square meter.

The results given in the following table show that the mixture had a synergistic action and an excellent selectivity in destroying the *Galium aparine* without affecting the gramineae.

| Active substance | Calcium monochloracetate | | | | Calcium salt of pentachlorobutadienoic acid | | | | Calcium monochloracetate+ calcium salt of pentachlorobutadienoic acid | | | |
|---|---|---|---|---|---|---|---|---|---|---|---|---|
| Percent | 2.0 | | 2.5 | | 0.1 | | 0.2 | | 2.0+0.1 | | 2.0+0.2 | |
| After days | 7 | 14 | 7 | 14 | 7 | 14 | 7 | 14 | 7 | 14 | 7 | 14 |
| Degree of damage to: | | | | | | | | | | | | |
| Galium aparine | 2 | 2 | 2 | 3 | 1 | 2 | 2 | 2.5 | 3 | 5 | 4 | 5 |
| Gramineae | 0 | 0 | 0 | 0 | 0 | 0 | 0 | 0 | 0 | 0 | 0 | 0 |

Example 3

Open land lots sown with barley (*Hordeum sativum*) and heavily infested with hennep nettle (*Galeopsis tetrahit*) and cleavers (*Galium aparine*) were sprayed with aqueous solutions of the calcium salt of monochloracetic acid and that of the pentachlorobutadienoic acid, and, for comparison, with a solution of the mixture of these two active substances. The liquors were applied at a rate of 1000 liters per hectare. The spraying was carried out in sunny weather by means of a portable sprayer with a medium size nozzle in repeating each spraying three times.

The results given in the following table show clearly the synergistic action of the calcium salt:

| Active substance | Calcium monochloracetate | | | Calcium salt of pentachlorobutadienoic acid | | | Calcium monochloracetate+ calcium salt of pentachlorobutadienoic acid | | |
|---|---|---|---|---|---|---|---|---|---|
| Percent | 2.5 | | | 0.1 | | | 2.5+0.1 | | |
| After days | 4 | 7 | 10 | 4 | 7 | 10 | 4 | 7 | 10 |
| Degree of damage to: | | | | | | | | | |
| Galeopsis ladanum | 1 | 2 | 2 | 1 | 1 | 2 | 3 | 4 | 5 |
| Galium aparine | 1 | 2 | 2 | 0 | 1 | 1 | 2 | 4 | 5 |
| Hordeum sativum | 0 | 0 | 0 | 0 | 0 | 0 | 0 | 1 | 0 |

Example 4

Open land lots of 4 square meters in area, planted with seed potatoes were sprayed in mid-August with aqueous solutions of the sodium salt of monochloracetic acid and that of pentachlorobutadienoic acid, with the addition of each time 0.02% of an alkylnaphthylsulfonate as wetting agent, and, for comparison, with a solution of a mixture of these two active substances.

The following table gives the results:

| Active substance | Sodium monochloracetate | | | Sodium salt of pentachlorobutadienoic acid | | | Sodium monochloracetate+ sodium salt of pentachlorobutadienoic acid | | |
|---|---|---|---|---|---|---|---|---|---|
| Percent | 5.0 | | | 0.5 | | | 5.0+0.5 | | |
| After days | 3 | 5 | 8 | 3 | 5 | 8 | 3 | 5 | 8 |
| Degree of damage to: Weed of Solanum tuberosum | 1 | 2 | 2 | 1 | 2 | 3 | 3 | 4 | 5 |

We claim:

1. A herbicidal composition consisting essentially of 0.1 to 0.5% by weight of a salt formed of pentachlorobutadienoic acid

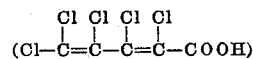

with a metal of the group consisting of alkali metal and alkaline-earth metals, 1 to 5% by weight of a salt formed of monochloroacetic acid with a metal of the group consisting of alkali metal and alkaline-earth metals, and a carrier, the application rate of said composition in aqueous form being 100 cc. per square meter of area.

2. The herbicidal composition of claim 1 wherein the ratio of the salt of pentachlorobutadienoic acid to the salt of monochloracetic acid is about 1:10 to 1:20 parts by weight.

3. A method for selectively destroying dicotyledonous weeds which comprises spraying on said weeds an aqueous solution of a herbicidal composition consisting essentially of a salt of pentachlorobutadienoic acid

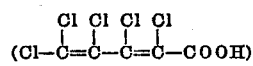

with a metal of the group consisting of alkali metals and alkaline-earth metals, a salt of monochloracetic acid with a metal of the group consisting of alkali metal and alkaline-earth metals, and a carrier, said aqueous composition being applied at 100 cc. per square meter, the ratio of said salts being sufficient to destroy dicotyledonous weeds.

References Cited in the file of this patent

UNITED STATES PATENTS

| | | |
|---|---|---|
| 2,622,974 | Swezey | Dec. 23, 1952 |
| 2,622,975 | Zimmerman et al. | Dec. 23, 1952 |
| 2,649,363 | Swezey | Aug. 18, 1953 |
| 2,789,044 | Steinmetz | Apr. 16, 1957 |